May 6, 1941.   H. A. SNOW   2,240,722
COLOR ANALYZER
Filed April 4, 1938   3 Sheets-Sheet 1
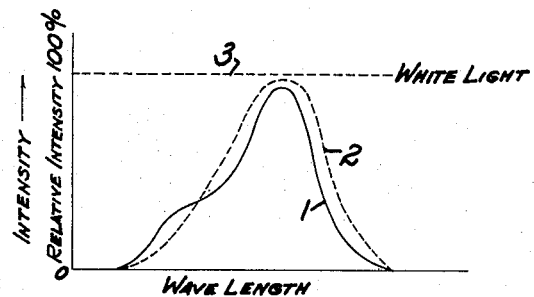
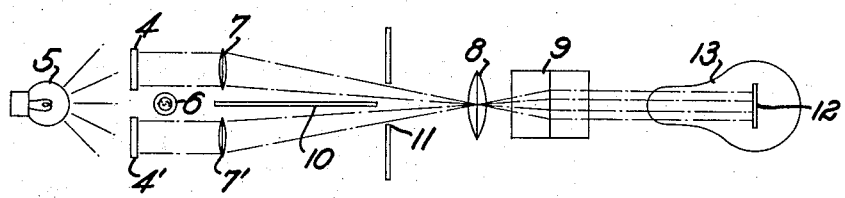
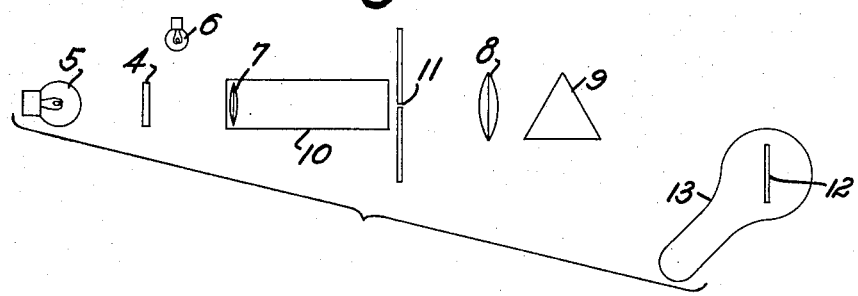
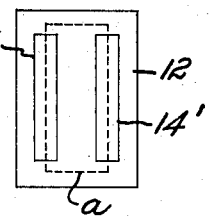

May 6, 1941.   H. A. SNOW   2,240,722
COLOR ANALYZER
Filed April 4, 1938   3 Sheets-Sheet 2

Inventor:
Harold A. Snow,
By Potter, Pierce + Schiffler
Attorneys.

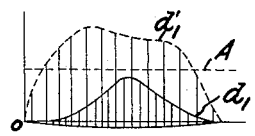
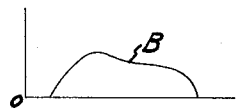
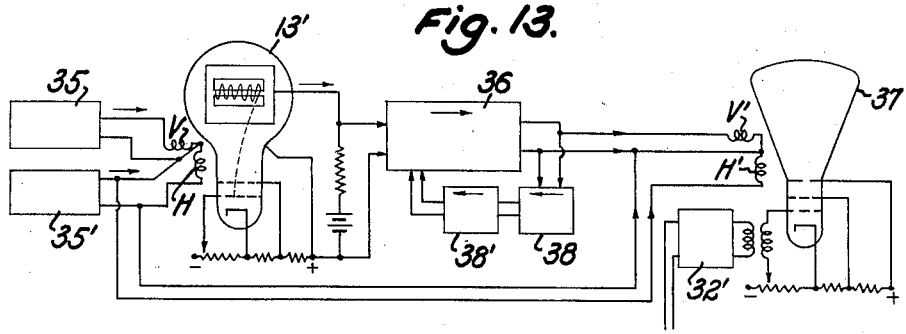
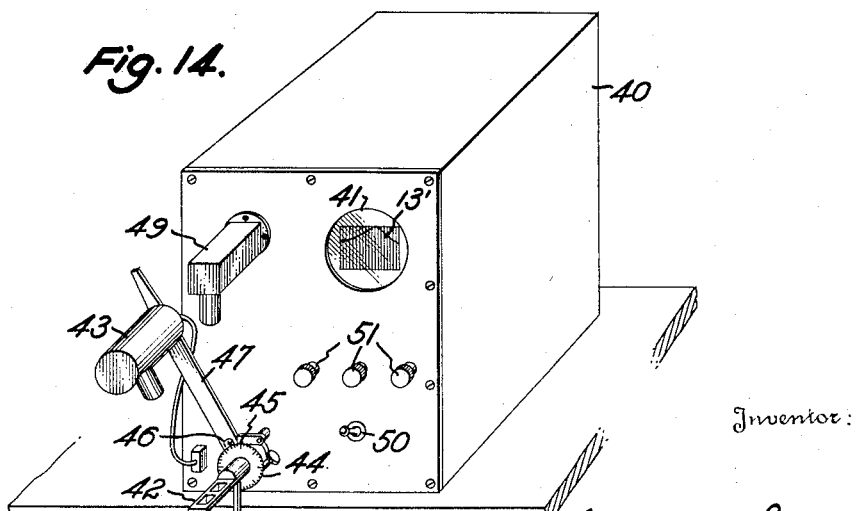

Patented May 6, 1941

2,240,722

UNITED STATES PATENT OFFICE 2,240,722

COLOR ANALYZER

Harold A. Snow, Mountain Lakes, N. J.

Application April 4, 1938, Serial No. 200,054

24 Claims. (Cl. 88—14)

This invention relates to color analyzers and more particularly to methods of and apparatus for obtaining a substantially instantaneous measurement of the wave length-light intensity relationship of specimens of fixed or of changing color.

The accurate measurement of the color of the light reflected from or transmitted through a specimen is generally accomplished by forming a spectrum and measuring the intensity of the light in the several successive narrow bands of color or wave length of the spectrum. The color in question may then be evaluated by comparison of the measured light intensity values at each wave length with the corresponding intensity values for the spectral components of standard white light. The known apparatus for color measurement by spectrum analysis is generally complicated and comparatively slow in operation. A photoelectric cell is commonly used in such apparatus to convert light intensities into electrical voltage or current variations, and mechanism must be provided for scanning the spectrum by relative movement of the spectrum and the cell. The apparatus is further complicated when the color of the light in question is compared with the color of white light or of a preselected standard.

The mechanical limitations of the prior apparatus for scanning the color spectrum have restricted the speed of operation and have required an appreciable time for a single color measurement. The utility of the prior apparatus has been limited as the time required for a single measurement has varied, with different apparatus, from about one minute to about one half hour.

Rough color measurements may be made by using a number of filters which each pass a band of colors. The total intensity of the light passed by each of the several filters gives an indication of the color value that is sufficiently accurate for some production tests but this method is inherently lacking in accuracy and attempts towards improvement by the use of a larger number of filters increase the time required for a single color measurement.

Objects of this invention are to provide methods of and apparatus for color measurement or color comparison that are characterized by the substantially instantaneous production of the light intensity-wave length chart of the color under investigation. Objects are to provide methods of and apparatus for the "dynamic," as distinguished from a static or step-by-step, measurement of the light intensity of the several monochromatic or individual wave length components of the color. More specifically, objects are to provide methods of and apparatus for color measurement by forming a spectrum of the color, scanning the color spectrum substantially instantaneously by an electron beam to obtain an electrical wave that varies with the light intensity of the spectrum components, and tracing a visible curve of the fluctuating electrical values by electron beam methods and apparatus. An object is to provide methods of and apparatus for color comparison by which the light at different wave lengths from a color specimen is directly plotted as a ratio of that light to the light intensity, at the corresponding wave lengths, from a standard which may be another color specimen or standard white light.

These and other objects and advantages of the invention will be apparent from the following specification when taken with the accompanying drawings in which—

Fig. 1 is a curve sheet showing the light intensity of the spectrum of a color specimen on an absolute basis and in comparison to the light intensity of the color spectrum of standard white light;

Fig. 2 is a diagrammatic view of the spectrum forming elements of an embodiment of the invention;

Fig. 3 is a side elevation of the same;

Fig. 4 is an elevation of the signal target of the "Iconoscope" on which the color spectrums are projected by the optical system;

Fig. 9 is a curve sheet illustrating the successive values, as plotted for one scanning period, of the electrical energy corresponding to light intensities across the color spectrums;

Fig. 10 is a similar view but showing the amplified electrical energy for one scanning period;

Fig. 11 is a similar view illustrating electrical energy against time when automatic volume control is introduced to prevent the output voltage of the amplifier from rising above a preselected level;

Fig. 12 is a curve sheet showing the output pulse, after filtering, from the automatic volume control unit;

Fig. 13 is a circuit diagram of apparatus for obtaining a ratio plotting of the color value of one specimen in comparison to a standard specimen; and Fig. 14 is a perspective view of one physical embodiment of the invention.

Figure 5:
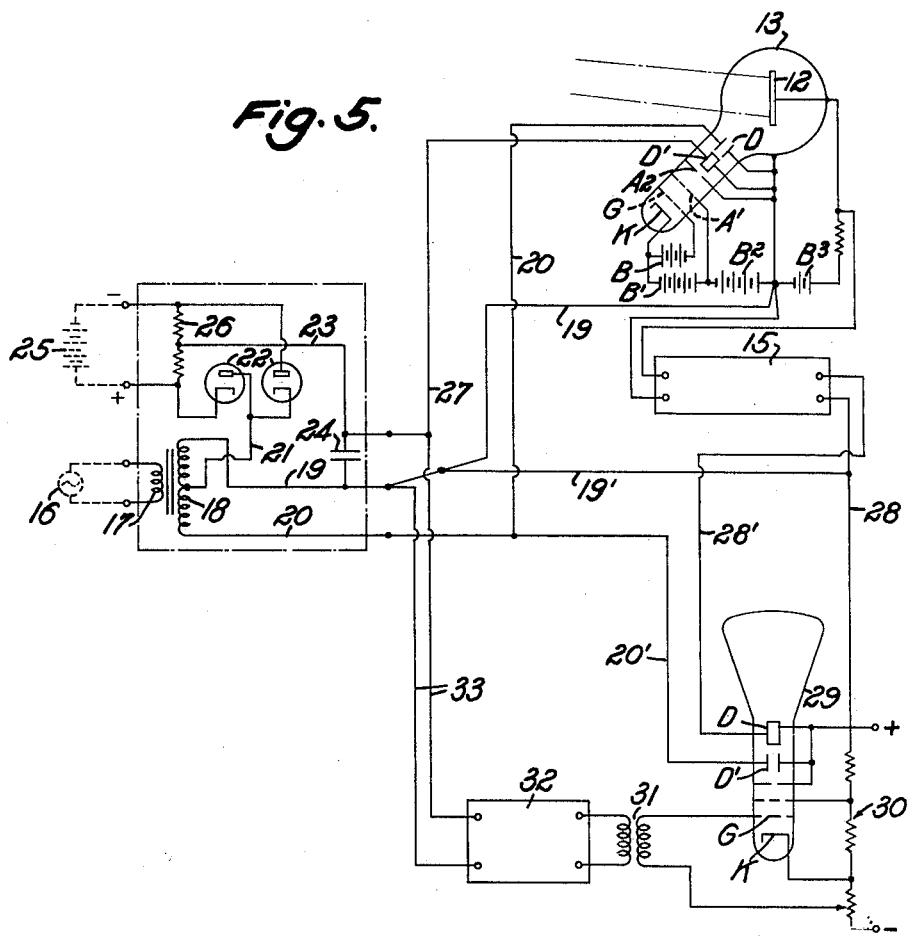
Fig. 5 is a diagram of the tubes and circuit connections of one form of the invention.

As shown by the curves of Fig. 1, the color of the light reflected from or transmitted through a specimen may be evaluated by either of two general systems. The absolute values of the light intensities at different wave lengths may be plotted as the solid line curve 1, or the ratio of the light intensities may be referred to the light intensities from another specimen, for example standard white light, to provide the dotted line curve 2 which shows the specimen light intensities at different wave lengths in proportion to the values, taken as 100%, of the light intensity at individual wave lengths of the standard color as represented by the horizontal line 3 of Fig. 1.

As shown in Figs. 2 and 3, the specimen 4 under investigation and a comparison specimen 4', that may be standard white, may be illuminated by a common light source 5 for investigation of the color effect from transmitted light or by a common light source 6 in the case of reflected light. Light from the specimens 4, 4' is passed by lenses 7, 7' and a common lens 8 to a prism 9, the paths of light from the specimens being separated from each other by a guard or baffle plate 10, and passing through a common slit 11. The separate spectrums produced by prism 9 from the separate specimens are directed upon the target 12 through the glass wall of an "iconoscope" type tube 13. The parallel arrangement of the separate spectrums 14, 14' on the target 12 is illustrated in Fig. 4. As will be understood from the television art, the spectrum or spectrums may be scanned by an electron beam to produce an electric voltage that varies as a function of the illumination of the target area traversed by the electron beam.

The fluctuating voltage thus produced as a function of the light intensity-wave length of the color from the specimens may be plotted, as will be described, by means of a cathode ray oscillograph. Alternatively, the light spectrums may be scanned at a low speed which permits measurement of the electrical voltages produced from the light spectrums of the specimens. It is preferred, however, to scan the light spectrums 14, 14' at rates in excess of about sixteen times per second to produce on a cathode ray tube instantaneous and continuous curves representing the light intensity-wave length relationship of the colors reflected from or transmitted by the individual specimens.

A circuit arrangement for the scanning of the separate spectrums and the individual identifications of the varying light intensities of the spectrums is shown in Fig. 5. The separate spectrums of the light reflected from or transmitted by the individual specimens are projected upon the target 12 of the "Iconoscope" 13. The "Iconoscope" 13 has sets of deflecting electrodes D, D', a cathode K, grid G and anodes A1, A2, between which appropriate energizing potentials are established by current sources which, for simplicity, are shown as batteries B, B1, B2, but a power supply system and voltage divider will preferably be used. The target 12 is maintained at an elevated potential by a current source B3 and the voltage fluctuations resulting from the scanning of the target are impressed upon an amplifier 15.

A generator for developing two wave forms for application to the deflecting plates D, D' of the "Iconoscope" 13 is shown diagrammatically within the dotted line rectangle of Fig. 5. An alternating source 16 works the primary winding 17 of a transformer having a tapped secondary winding 18. One terminal of the secondary 18 (the upper terminal as shown in Fig. 5) is connected by the common lead 19 of the deflecting system to the junction of current sources B2, B3, and to one plate of each set of deflecting plates D, D' and to anode A2. The opposite terminal of the secondary 18 is connected by lead 20 to the other plate of the horizontal deflecting plates D, to impress a sine wave across the plates.

The tap on the secondary winding 18 is connected by lead 21 through the pair of oppositely arranged diodes 22 and lead 23 to one side of the condenser 24, the other side of the condenser being connected to the common lead 19 of the beam deflecting system. A direct current source 25, of less potential than that of the associated section of the secondary 18, is connected between the cathode of one diode 22 and the anode of the other diode, and the lead 23 is connected to the center tap of the resistor 26 that is shunted across the current source 25. The second plate of the vertically deflecting pair D' is connected to the outer side of the condenser 24 by a lead 27. The condenser 24 is charged by the peaks of the alternating current voltage developed across a section of the secondary 18, in opposite directions as this voltage reverses, and the resultant wave form impressed upon the vertical deflecting plates D' is flat topped.

The voltages are so chosen or adjusted that the electron beam sweeps across the spectrums 14, 14' on target 12 in the approximately rectangular path indicated by dotted line a in Fig. 4. The fluctuating voltage which varies with changes in the illumination of this path a is amplified by the vacuum tube amplifier 15 and impressed by leads 28, 28' across the vertical deflecting plates D of the cathode ray oscillograph 29. The common lead 19 of the deflecting system of the "Iconoscope" 13 is connected to lead 28 by a jumper 19', and a lead 20' extends from lead 20 to one of the horizontal deflecting plates D' of the cathode ray tube. The other plate D' is connected to lead 28 and to the positive terminal of a potential source that is indicated by the voltage divider 30.

The cathode ray tube 29 may be of conventional construction and its elements and the usual connections to the voltage divider will not be described in detail. The tube connections include a novel circuit connection to provide a distinction between the visual indications resulting from the scanning of the separate spectrums 14, 14'. Grid G of the tube 29 is returned to the cathode K through a circuit that is coupled by transformer 31 to the "dotting" oscillator 32. This oscillator is of conventional type and generates a substantially higher frequency than that of the alternating current source 16 of the beam deflecting system. The flat topped alternating current voltage developed across the condenser 24 is impressed upon the oscillator 32 as a bias voltage, and this bias voltage has a magnitude which blocks operation of oscillator 32 on negative swings of the bias voltage. The oscillator 32 is thus rendered inoperative periodically at times corresponding to the vertical traverse of the scanning beam along one of the spectrums 14, 14', for example the spectrum 14 corresponding to the specimen 4 which is under examination.

When the dotting oscillator 32 is blocked, the electron beam of the cathode ray tube 29 is controlled in magnitude only by the steady bias potential from source 30 and a continuous line 34 is traced on the screen, and the vertical displacement of the several points of this line corresponds to the illumination at different points in the spectrum 14 of the light from specimen 4. The dotting oscillator 32 functions during the alternate half-cycles of the deflecting system during which the scanning beam traverses the spectrum 14' from specimen 4'. Negative voltage swings of the oscillator 32 reduce the bias on grid G of the cathode ray tube to block the electron beam, and the beam is thus periodically interrupted to produce a dotted line curve 34' corresponding to the light intensity-wave length characteristic of the spectrum 14' of the comparison specimen 4'.

The color composition of a specimen 4 may thus be compared directly with that of another specimen, which may be standard white. The comparison is instantaneous as the complete curves for each specimen appear continuously on the screen of the cathode ray tube when the spectrums are alternately scanned at a frequency of, or preferably upward of, a few hundred cycles per second. Obviously, in addition to the simultaneous comparison of two spectrums, of course, a single spectrum only may be scanned at one time to produce a single curve 34 that may be measured or compared with a preselected curve that is drawn on a transparent sheet or is shaped as an opaque template.

Figure 7:
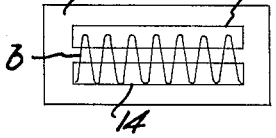
Fig. 7 is a schematic view, not to scale, illustrating the scanning path of the electron beam with respect to a signal target such as shown in Fig. 4.
Figure 8:
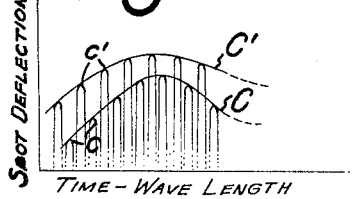
Fig. 8 is a schematic view illustrating the manner in which the visible curves are plotted by the cathode ray tube.

The spectrums may also be scanned by moving the electron beam along a path such as indicated, but not to scale, by the line b of Fig. 7. The horizontal traverse of the electron beam may be at, for example, 60 cycles per second while the vertical traverses are at a much higher rate of, for example, about 100,000 per second. The pitch of curve b is therefore greatly exaggerated in Fig. 7 as each vertical displacement of the beam occurs so rapidly, in comparison to the 60 cycles per second horizontal displacement, as to correspond substantially to a single monochromatic line on the spectrum. The curves traced on the oscillograph tube in this method of scanning are shown, with great amplification as to time values, in Fig. 8. The vertical displacement of the luminescent spot on the fluorescent screen is at such a high rate that only a slight glow is produced below the succession of spots c, c' that correspond to the peak voltages developed by excursions of the electron beam in alternation across the separate spectrums. The pitch of the spots c and c' is infinitesimal when a scanning frequency of the order of 100,000 cycles per second is used, and the spots of each system coalesce to form lines C, C'.

Apparatus for alternately scanning the separate spectrums on the "Iconoscope" target is shown diagrammatically in Fig. 13. Electromagnetic deflecting systems are shown but the same operation may be had, if desired, with electrostatic deflecting systems such as shown in Fig. 5.

The deflecting system of the scanning tube 13' is represented by the vertical deflecting coil V and the horizontal deflecting coil H that are supplied with alternating or sawtooth voltages by sources 35, 35', respectively. Source 35 for the vertical deflection develops a high frequency voltage which may be 100,000 cycles per second, while source 35' develops a voltage of low frequency which may be 60 cycles per second. The general construction and circuit connections of the "Iconoscope" scanning tube may be conventional and are illustrated but need not be described in detail. The voltage fluctuations developed by the scanning tube 13' are amplified by the amplifier 36 and the amplified voltage energizes the vertical deflecting coil V' of the cathode ray tube 37. The horizontal deflecting coil H' of tube 37 is connected across the low frequency source 35' and the horizontal travel of the beam of the oscillograph tube is thus synchronized with the horizontal travel of the scanning beam. The general form and circuit connections of tube 37 may conform to the usual practice except that, as in the circuit of Fig. 5, a dotting oscillator 32' controls the grid bias on tube 37 to afford a visual distinction between the curves for the separate spectrums. The blocking of the dotting oscillator 32' is controlled by the voltage reversals of the high frequency source 35 which produces the vertical displacement of the scanning electron beam.

Figure 6:
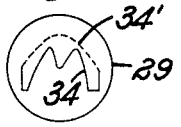
Fig. 6 is an end elevation of the cathode ray tube of Fig. 5, the comparative color value curves of two specimens being shown on the fluorescent screen of the tube.

The apparatus of Fig. 13, so far as described, will produce oscillograph curves such as shown in Fig. 6. It is frequently desirable to measure the light intensity of a specimen, at different wave lengths, as the ratio to the corresponding light intensities of another specimen (which may be standard white) at the same wave lengths. This evaluation of color values as a ratio may be readily accomplished electrically by the use of an automatic volume control 38 with the amplifier 36. The control voltage developed by the A. V. C. unit 38 is preferably filtered by a low pass filter 38' before application to the amplifier 36.

The operation of the automatic volume control will be apparent from the curves of Figs. 9 to 12, inclusive. Curves $d, d'$ of Fig. 9 indicate the voltage pulses at the input to amplifier 36 corresponding to the light intensity-wave length of the spectrums 14, 14', respectively. If the automatic volume control unit is not present, the voltage-time characteristics of the amplified impulses at the amplifier output terminals are as shown by curves $d_1, d'_1$ of Fig. 10. The envelopes of these waves are not symmetrical but drop slightly below zero during the time between successive pulses and the amount of this drop may be controlled by the length of the interval between pulses. When the automatic volume control unit is employed, as it is biased beyond cutoff to be inoperative below a definite voltage level corresponding to line A of Fig. 10, the pulse peaks are reduced to a level A', Fig. 11, that is slightly higher than the voltage value A of Fig. 10. The automatic volume control 38 functions to pass a low frequency pulse roughly of the form shown by curve B of Fig. 12 and results in a controlled operation that is substantially instantaneous.

The resultant voltage-time relationships of the amplified electrical pulses from the scanning tube therefore have the forms shown by curves $d_2, d'_2$ of Fig. 11, and the curves plotted on the screen of the tube 37 have corresponding shapes. The light intensity of the unknown specimen at various wave lengths is thus measured as a ratio of the light intensity of a standard specimen at the same wave lengths.

It is apparent from the foregoing that the operation of such an automatic volume or level control holds the maximum output voltage of the amplifier at a substantially constant value regardless of the overall sensitivity of the entire apparatus and that it therefore automatically compensates for any normal variation in sensitivity or color response of the apparatus and for variation in the illumination of the specimen.

For example, referring to Fig. 11, the curve $d'_2$ may be produced from a standard white specimen inserted in the apparatus for reference and the horizontal portion of this curve may be used as a 100 percent reference curve, and curve $d_2$ may be produced from a specimen the color of which is to be determined. The vertical amplitude of the reference curve $d'_2$ is held substantially constant by the automatic level control regardless of the variations in overall sensitivity of the apparatus, while the ratio of the amplitude of curve $d_2$ to that of $d'_2$ is not changed. The horizontal abscissae of Fig. 11 correspond directly to light wave length and the ordinates correspond to relative light intensity. Thus the height of the curve $d_2$, as compared to that of $d'_2$, shows directly the light intensity of the unknown specimen as a percentage of that of standard white at any wave length included by the apparatus regardless of sensitivity variations of the apparatus.

It will also be apparent from the foregoing description that more than two spectrums may be scanned substantially simultaneously by locating additional spectrums beside the two shown in Fig. 7 and increasing the amplitude of scanning to cover all the spectrums, with the result that a separate curve is produced for each spectrum.

An appropriate physical embodiment of apparatus for color measurement and comparison is shown in Fig. 14. A box or casing 40 houses the scanning tube or "Iconoscope," the amplifier and its control elements, and the oscillograph or "Kinescope" tube 13' which is so mounted in the casing that its fluorescent screen is visible through an opening 41 in the front of the casing. A platform 42 for supporting the samples 4, 4' and a housing 43 of the light source are mounted on the front panel of casing 40 for angular adjustment about a common axis, the platform carrying a graduated scale disk 44 for cooperation with a fiducial mark 45 that is fixed to the casing and a fiducial mark 46 on the lever 47 that supports the light source. When the casing 40 is arranged, as shown, at the edge of a table or other support 48, the light source may be turned to a position below the specimen platform for measurement of the color value of the light transmitted through the specimens. The optical system for directing light from the specimen or specimens to the scanning tube is mounted within the housing 49 that projects from the panel of casing 40 into a position above the platform 42. An on-off switch 50 and control knobs 51 for the electrical circuits are mounted on the panel front of the casing, one of the control knobs being a switch for throwing the automatic volume control system into and out of operation to obtain a comparison of light values on a proportional or an absolute basis by the plotting of curves corresponding to the voltage-time curves of Figs. 10 and 11, respectively.

Permanent records of the curve or curves produced on the indicator tube may be made by known photographic processes. The primary use of the invention is, however, for the rapid measurement or comparison of the color value of the specimens by inspection of the curves plotted on the screen of the indicator tube. Color changes in the light from the specimens are registered instantaneously and the invention thus provides a means for determining the control of industrial processes that are characterized by a change in the color of the solution or substance under treatment. The complete spectrum analysis is made in a fraction of a second and with an accuracy far above that of previous methods of rapid color measurement by observation of the color values at only a few wave lengths or ranges of wave lengths.

It is to be understood that the invention is not limited to the exact methods and apparatus herein described as many variations which may occur to those skilled in the art fall within the spirit of my invention as set forth in the following claims. I believe that it is broadly new to produce a spectrum of the light from one or more specimens and to scan the spectrum or spectrums repeatedly at time intervals substantially less than the persistance of vision, i. e. at intervals less than about $\frac{1}{16}$ of a second.

I claim:

1. An instrument for analyzing the color of one or more specimens comprising, in combination, spectra analyzing means, including a photo electric device and a scanning device, for producing in said photoelectric device electrical values of varying magnitudes the variations of which correspond respectively to the variations of light intensity along the spectra being analyzed, means for cyclically operating said analyzing means, electronic means connected to said photoelectric device for amplifying said values, a screen, electrical means for projecting a beam on said screen to produce a visible trace thereon as the beam and screen move relative to one another, means responsive to said amplified values for effecting relative movement between said beam and said screen in one direction, cyclically operated means for effecting relative movement between said beam and said screen at an angle to said first direction, and means for synchronizing said last-mentioned means with said cyclically operated analyzing means, the period of operation of said analyzing means and of said cyclically operated means approximating the period of persistence of vision.

2. An instrument for analyzing the color of one or more specimens comprising, in combination, spectra analyzing means, including a photoelectric device and a scanning device having a scanning range of at least two spectra, for producing in said photoelectric device electrical values of varying magnitudes the variations of which correspond respectively to the variations of light intensity along the spectra being analyzed, means for cyclically operating said analyzing means, electronic means connected to said photoelectric device for amplifying said values, a screen, electrical means for projecting a beam on said screen to produce a visible trace thereon as the beam moves relative to the screen, means responsive to said amplified values for deflecting said beam in one direction, cyclically operated means for deflecting said beam at an angle to said first direction, the frequency of curve producing operation of said last-mentioned means being so related to the frequency of said spectra analyzing means that the trace on said screen forms a plurality of superimposed curves equal in number to the number of specimens being analyzed, and means for synchronizing said last-mentioned means with said cyclically operated analyzing means.

3. An instrument for analyzing the color of one or more specimens comprising, in combination, spectra analyzing means, including a photoelectric device and a scanning device having a scanning range of at least two spectra, for producing in said photoelectric device electrical values of varying magnitudes the variations of which correspond respectively to the variations of light intensity along the spectra being analyzed, means for cyclically operating said analyzing means, electronic means connected to said photoelectric device for amplifying said values, a screen, electrical means for projecting a beam on said screen to produce a visible trace thereon as the beam moves relative to the screen, means responsive to said amplified values for deflecting said beam in one direction, cyclically operated means for deflecting said beam at an angle to said first direction, the frequency of curve producing operation of said last-mentioned means being a multiple of that of said analyzing means equal to the number of specimens being scanned whereby the trace on said screen forms a plurality of superimposed curves, equal in number to the number of spectra being analyzed, and means for synchronizing said last-mentioned means with said cyclically operated analyzing means.

4. Apparatus as described in claim 2, in combination with means for periodically blocking the production of at least one of said curves at a frequency of an order substantially higher than the frequency of said spectra analyzing means so that said curve appears as a broken line on said screen.

5. An instrument for analyzing the color of one or more specimens, comprising, in combination, spectra analyzing means, including a photoelectric device and a scanning device, for producing in said photoelectric device electrical values of varying magnitudes the variations of which correspond respectively to the variations of light intensity along the spectra being analyzed, means for cyclically operating said analyzing means, electronic means connected to said photoelectric device for amplifying said values, a screen, electronic means for projecting a beam on said screen to produce a visible trace thereon as the beam moves relative to the screen, a pair of deflecting plates connected to said first-mentioned electronic means and responsive to said amplified values for deflecting said beam in one direction, cyclically operated means including a second set of deflecting plates associated with said first-mentioned plates and with said second-mentioned electronic means for deflecting said beam at an angle to said first direction, and means for synchronizing said last-mentioned means with said cyclically operated analyzing means, the period of operation of said analyzing means and of said synchronously operated deflecting plates approximating the period of persistence of vision.

6. An instrument for analyzing the color of a specimen comprising, in combination, an electronic device having a photosensitive target, means including an optical system for projecting on said target the spectrum of a color specimen, means in said device for projecting an electron beam on said target, cyclically operated means for scanning said spectrum with said beam whereby said photosensitive target produces an electrical value of varying magnitude which corresponds to the variation of light intensity along said spectrum, electronic means connected to said electronic device for amplifying said value, a screen, means for projecting a beam of radiant energy on said screen to produce a visible trace thereon as the beam moves relative to the screen, means responsive to said amplified value for deflecting said beam in one direction, cyclically operated means for deflecting said beam at an angle to said first direction, and means for synchronizing said last-mentioned means with said scanning means, the period of operation of said scanning means and of said synchronously operated deflecting means approximating the period of persistence of vision.

7. An instrument for analyzing the color of a plurality of specimens, comprising, in combination, an electronic device having a photosensitive target, means including an optical system for projecting on said target the spectra of color specimens, means associated with said device for projecting an electron beam on said target, means for deflecting said beam over said target, means for cyclically operating said deflecting means to scan said spectra with said beam to produce in said electronic device by the action of said photosensitive target electrical values of varying magnitudes which correspond with the variations of light intensity along said spectra, electronic amplifying means connected to said electronic device for amplifying said values, a screen, means for projecting a beam of radiant energy on said screen to produce a visible trace thereon as the beam moves relative to the screen, means responsive to said amplified values for deflecting said beam in one direction, cyclically operated means for deflecting said beam at an angle to said first direction, means for synchronizing said last-mentioned means with said scanning means, the period of operation of said scanning means and said synchronously operated deflecting means approximating the period of persistence of vision, and means connected to said amplifying means to automatically control the operation thereof to limit the amplified values to a predetermined maximum whereby the deflection of said beam of radiant energy in said first direction for each of said values is manifested as a percentage of the deflection for said predetermined value.

8. The method of color analysis which includes the steps of periodically producing an electrical value of varying magnitude which varies with the magnitude of the light emanating from a specimen at predetermined wave lengths, amplifying said value, projecting a beam on a screen to produce a visible trace thereon when the beam and the screen are moved relative to one another, effecting relative movement between said beam and said screen in one direction by the application to one of them of said amplified value, effecting further relative movement between said beam and said screen at an angle to said first direction, and synchronizing said last-mentioned movement with the cycle of production of said electrical value so that the period of production of said electrical value and of said further relative movement approximates the period of persistence of vision.

9. The method of color analysis which includes the steps of periodically producing an electrical value of varying magnitude which varies with the magnitude of the light emanating from a specimen at predetermined wave lengths, amplifying said value, projecting a beam on a screen to produce a visible trace thereon when the beam is moved relative to the screen, deflecting said beam in one direction by the application thereto of said amplified value, deflecting said beam at an angle to said first direction, and synchronizing said last-mentioned deflection with the cycle of production of said electrical value so that the period of production of said electrical value and of said second deflection approximates the period of persistence of vision.

10. The method of color analysis which includes the steps of periodically producing an electrical value of varying magnitude which varies with the magnitude of the light emanating from a specimen at predetermined wave lengths, amplifying said value, projecting an electronic beam on a fluorescent screen to produce a visible trace thereon when the beam is moved relative to the screen, deflecting said beam in one direction by the application thereto of said amplified value, deflecting said beam at an angle to said first direction, and synchronizing said last-mentioned deflection with the cycle of production of said electrical value so that the period of production of said electrical value and of said second deflection approximates the period of persistence of vision.

11. The method of color analysis which includes the steps of projecting the spectrum of a color specimen, converting the light value of said spectrum into an electrical value of varying magnitude which varies with the magnitude of said light value, electronically amplifying said value, projecting an electronic beam on a screen to produce a visible trace thereon when the beam and the screen are moved relative to one another, effecting relative movement between said beam and said screen in one direction by the application to one of them of said amplified value, effecting further relative movement between said beam and said screen at an angle to said first direction, and synchronizing said last-mentioned movement with the cycle of production of said electrical value so that the period of production of said electrical value and of said second movement approximates the period of persistence of vision.

12. The method of color analysis which includes the steps of periodically producing electrical values of varying magnitudes which vary with the magnitudes of light intensity emanating from a plurality of specimens at predetermined wave lengths, amplifying said values, projecting a beam on a screen to produce a visible trace thereon when the beam and the screen are moved relative to one another, effecting relative movement between said beam and said screen in one direction by the application to one of them of said amplified values, effecting further relative movement between said beam and said screen at an angle to said first direction, and synchronizing said last-mentioned movement with the cycle of production of said electrical values so that the period of production of said electrical values and of said second movement approximates the period of persistence of vision.

13. The method of color analysis which includes the steps of producing the spectrum of a color specimen, projecting said spectrum on a photosensitive surface, producing an electronic beam, moving said beam over said surface to scan said spectrum to produce an electrical value of a magnitude varying with the magnitude of the wave length of the light in said spectrum, amplifying said value, producing a beam of radiant energy, projecting said beam on a screen to produce a visible trace thereon when the beam and the screen are moved relative to one another, effecting relative movement between said beam and said screen in one direction in response to said amplified value, periodically effecting relative movement between said beam and said screen at an angle to said first direction, and synchronizing said last-mentioned movement with the cycle of production of said electrical value, the period of said cycle approximating the period of persistence of vision.

14. The method of comparing a plurality of color specimens which includes the steps of producing spectra of said specimens, projecting said spectra on a photosensitive surface in a plurality of parallel strips, producing an electronic beam, moving said beam over said surface to scan said spectra in a path approximating a sinusoidal wave of relatively high frequency with an axis parallel to said strip spectra to produce a series of electrical values the magnitudes of which vary progressively with the progressive variations in the magnitudes of the wave lengths of light along said spectra, amplifying said values, projecting a beam of radiant energy on a screen to produce a visible trace thereon when the beam and the screen are moved relative to one another, deflecting said beam in one direction in response to said amplified values, periodically deflecting said beam at an angle to said first direction, and synchronizing said last-mentioned deflection with the cycle of production of a complete series of said electrical values, the period of a cycle of production of said series of electrical values and of said second deflection approximating the period of persistence of vision.

15. The herein described art which includes the steps of making repeated periodic spectrophotometric analyses of two or more color specimens, said analyses being made at a rate of not less than sixteen per second, producing a visible curve representative of each of said analyses substantially simultaneously with the making thereof whereby there are instantaneously produced a number of curves equal to the number of specimens analyzed, and substantially simultaneously superimposing said curves on a common scale.

16. The method of continuously comparing two or more colors, which includes the steps of serially making spectro-photometric analyses of the colors whereby each cycle of operation comprises successive analyses of the colors, continuously repeating said cycle of operation, creating a curve representative of the analysis of each color simultaneously with the making thereof whereby for each cycle of operation there are created curves equal in number to the colors being compared, and simultaneously superimposing all of said curves relative to a common scale to visibly represent the quantitative and qualitative characteristics of each color.

17. The method of continuously comparing two or more colors, which includes the steps of serially making spectrophotometric analyses of the colors whereby each cycle of operation comprises successive analyses of the colors, continuously repeating said cycle of operation, creating a curve representative of the analysis of each color simultaneously with the making thereof whereby for each cycle of operation there are created curves equal in number to the colors being compared, imparting a visible distinctive characteristic to one of said curves, and simultaneously superimposing all of said curves relative to a common scale to visibly represent the quantitative and qualitative characteristics of each color.

18. The method of color analysis which includes the steps of periodically producing electrical values of varying magnitudes which vary with the magnitudes of the light emanating from a plurality of specimens at predetermined wave lengths, amplifying said values, producing a visible curve representative of each of said electrical values substantially simultaneously with the production of such values whereby there are instantaneously produced a number of curves equal to the number of specimens analyzed, and superimposing said curves on a common scale.

19. The method of color analysis which includes the steps of periodically producing electrical values of varying magnitudes which vary with the magnitudes of the light emanating from a plurality of specimens at predetermined wave lengths, amplifying said values, producing a visible curve representative of each of said electrical values substantially simultaneously with the production of such values whereby there are instantaneously produced a number of curves equal to the number of specimens analyzed, imparting a visible distinctive characteristic to one of said curves, and superimposing said curves on a common scale.

20. The method of continuously comparing two or more colors which includes the steps of serially making spectrophotometric analyses of the colors whereby each cycle of operation comprises successive analyses of the colors, continuously repeating said cycle of operation, producing for each analysis an electrical value of varying and substantial magnitude, the variations of each of said values being characteristic of the respective analyses, simultaneously producing a beam of radiant energy and projecting said beam on a screen to produce a visible trace thereon when the beam and screen are moved relative to one another, effecting relative movement between said beam and said screen in one direction by the application to one of them of said electrical values substantially simultaneously with the production thereof, simultaneously effecting further relative movement between said beam and said screen at an angle to said first direction, the relative movement between said beam and said screen in said directions creating curves on said screen representative of said analyses of the colors simultaneously with the making of such analyses, and synchronizing said last-mentioned movement with the cycle of production of said electrical values.

21. In apparatus of the character described, in combination, spectrophotometric means for making analyses of two or more color specimens, means for effecting repeated periodic operation of said spectrophotometric means to produce said analyses at a rate of on the order of sixteen per second, means operatively connected to said spectrophotometric means for producing a visible curve representative of each of said analyses substantially simultaneously with the making thereof whereby there are substantially instantaneously produced a number of curves equal to the number of specimens analyzed, and means associated with said curve producing means for substantially simultaneously superimposing said curves on a common scale.

22. In apparatus of the character described, in combination, spectrophotometric means for making analyses of two or more color specimens, means for effecting repeated periodic operation of said spectrophotometric means to produce said analyses at a rate of on the order of sixteen per second, electronic means operatively connected to said spectrophotometric means for producing a visible curve representative of each of said analyses substantially simultaneously with the making thereof whereby there are substantially instantaneously produced a number of curves equal to the number of specimens analyzed, and means associated with said curve producing means for substantially simultaneously superimposing said curves on a common scale.

23. In apparatus of the character described, in combination, means for serially making spectrophotometric analyses of two or more colors, each cycle of operation of said means comprising successive analyses of said colors, means associated with said first-mentioned means for continuously repeating said cycle of operation, means operatively connected to said first-mentioned means for creating a curve representative of the analysis of each color simultaneously with the making thereof, whereby for each cycle of operation there are created curves equal in number to the colors being analyzed, and means associated with said curve producing means for simultaneously superimposing all of said curves on a common scale.

24. In apparatus of the character described, in combination, means for serially making spectrophotometric analyses of two or more colors, each cycle of operation of said means comprising successive analyses of said colors, means associated with said first-mentioned means for continuously repeating said cycle of operation, means operatively connected to said first-mentioned means for creating a curve representative of the analysis of each color simultaneously with the making thereof, whereby for each cycle of operation there are created curves equal in number to the colors being analyzed, means associated with said curve producing means for imparting a visible distinctive characteristic to one of said curves, and means associated with said curve producing means for simultaneously superimposing all of said curves on a common scale.

HAROLD A. SNOW.